Sept. 8, 1925.  
G. L. KNOX  
1,552,620  
TRAILER COUPLING  
Filed April 9, 1923   2 Sheets-Sheet 1
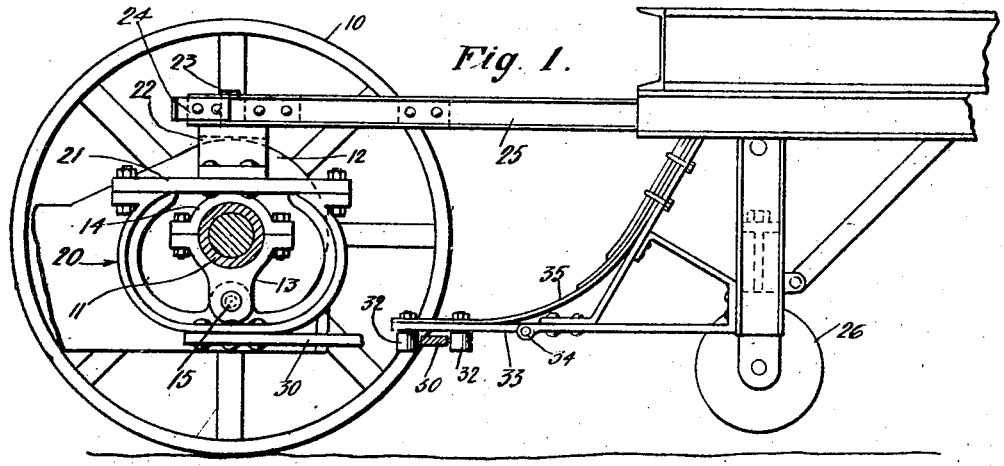
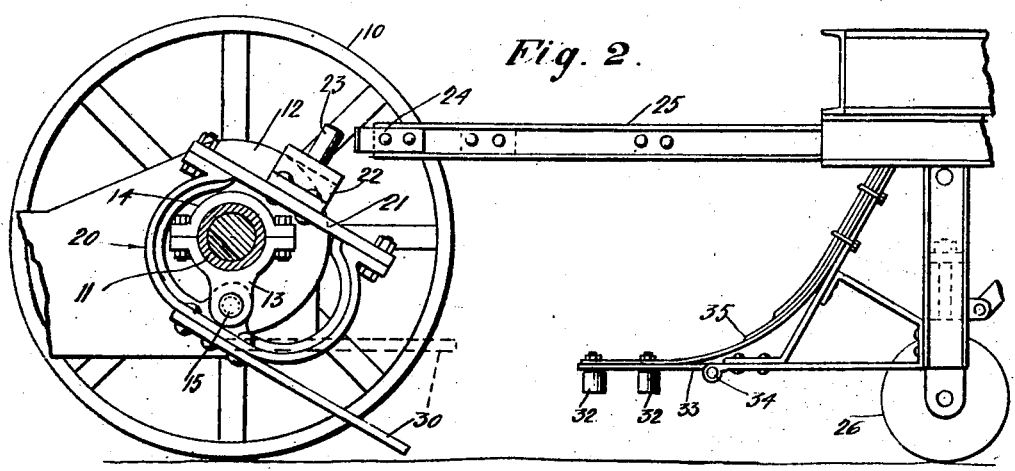
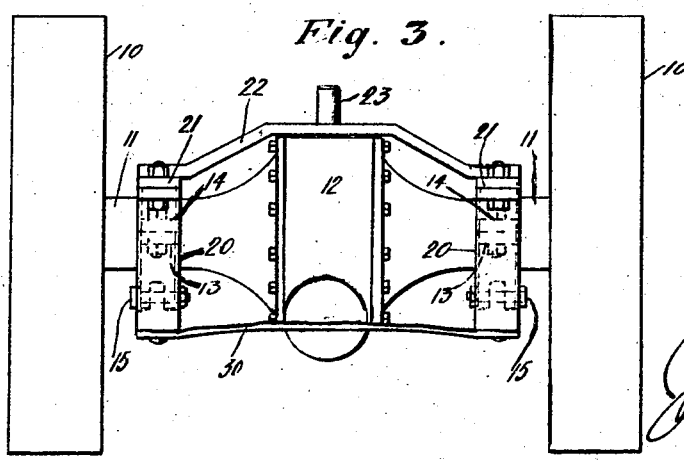
Inventor  
Garner L. Knox  
by  
his Attorney Sept. 8, 1925.  G. L. KNOX  1,552,620
TRAILER COUPLING
Filed April 9, 1923   2 Sheets-Sheet 2

Inventor.
Garner L. Knox.

Patented Sept. 8, 1925.

1,552,620

UNITED STATES PATENT OFFICE.

GARNER L. KNOX, OF LOS ANGELES, CALIFORNIA, ASSIGNOR TO UTILITY TRAILER MANUFACTURING COMPANY, A CORPORATION OF CALIFORNIA.

TRAILER COUPLING.

Application filed April 9, 1923. Serial No. 630,752.

*To all whom it may concern:*

Be it known that I, GARNER L. KNOX, a citizen of the United States, residing at Los Angeles, in the county of Los Angeles and State of California, have invented new and useful Improvements in Trailer Couplings, of which the following is a detailed specification.

This invention relates to trailer couplings; and more particularly to couplings adapted to a two-wheeled trailer, the forward end of which is supported by the towing vehicle. And a general object of the invention is the provision of a coupling mechanism that will provide for automatic elevation of the trailer onto the supporting vehicle, where it is supported on a strong and rigid structure.

Devices for elevating the forward end of a two-wheel trailer, and coupling that forward end to a truck or other towing vehicle, are well known in the art; but so far as I am aware such devices have usually been mounted on the vehicle frame. Certain types of trucks or tractors have either no frame at all or a frame of such type as to make it inconvenient to mount such a device thereon; and in any situation, and particularly in those above stated, it has been found desirable, in some instances at least, to mount the trailer carrying devices directly on the rear axle or rear axle housing, where the strains are most directly transmitted to the rear supporting wheels of the towing vehicle. My invention provides a peculiarly effective device adapted to be mounted in such a position; and in the following description I describe my device so mounted. Although specifically I prefer to mount the device directly on the rear axle housing; and the device is specifically here shown as designed for that mounting; yet, in its broader aspects, it will be understood that the invention is not necessarily limited to being specifically so mounted.

There are other objects and corresponding features of accomplishment of the invention, including, in a device of this type, a means for automatically coupling the trailer to the towing vehicle; but all the objects and features of accomplishment will be best understood from the following detailed description of a specific form and arrangement that is illustrative of the invention, reference for this purpose being had to the accompanying drawings.

Figure 5:
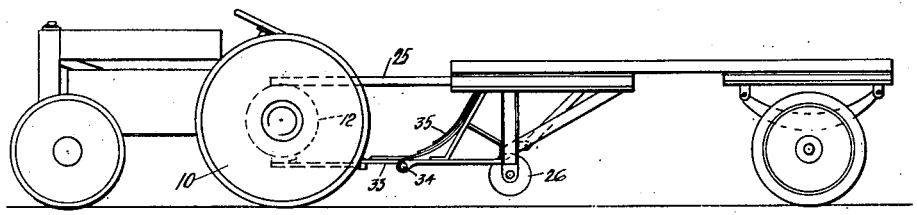
Figure 4:
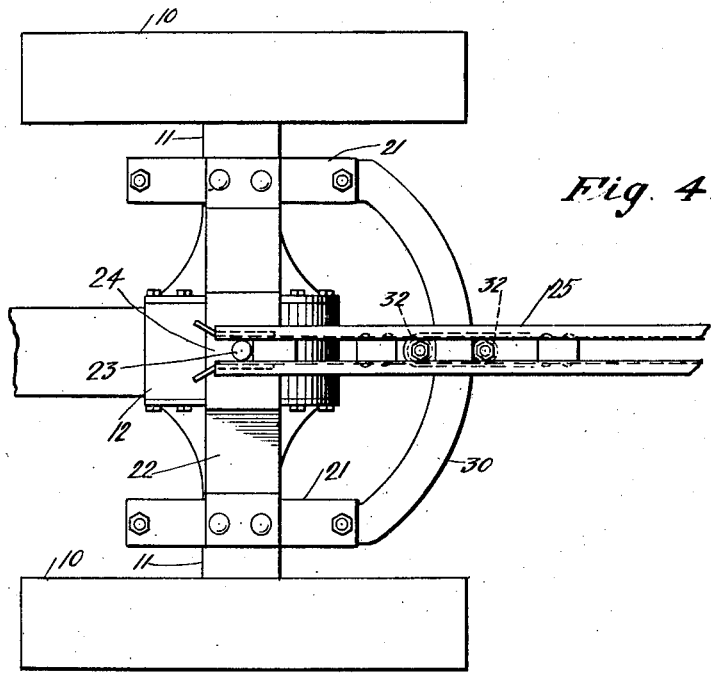

Fig. 1 is a longitudinal elevation, with parts in section, showing the trailer coupled to the towing vehicle; Fig. 2 is a similar view showing the parts in the position they assume when the trailer is uncoupled; Fig. 3 is a rear end elevation of the towing vehicle; Fig. 4 is a plan of the rear end of the towing vehicle; Fig. 5 is a small side elevation showing the towing vehicle and the trailer.

In the drawings I show at 10 the rear wheels of the towing vehicle and at 11 its rear axle housing with the differential casing 12 situated centrally of the axle housing. On the axle housing I mount two supporting members 13, one close to each wheel 10. These supporting members may be rigidly affixed to the axle housing by clamps 14 as illustrated, and they preferably depend from the axle housing and carry pivot pins 15 at their lower ends. This location of the pivot, at a point below the axle housing, gives the desired long radius of swinging action to the pivoted structure that is mounted on members 13, and at the same time allows the upper bridge portion of the pivoted structure to lie closely to the axle housing and differential case 12. This will also be understood from the drawings. This positioning of pivot pin 15 also, as will be understood from consideration of the structure, applies the weight of the trailer to the towing vehicle at a point below the rear axle of that vehicle. In this position, if the front end of the towing vehicle rises, these pivot points are correspondingly moved forward from a position under the axle and the weight of the trailer applied at this point then exerts a force tending to prevent further rising of the front end and tending to return the front end down.

Pivoted on each pivot pin 15 is a yoke 20 having two upwardly extending arms to which are bolted or otherwise secured the cross plates 21 that lie across and over the axle housing 11. Mounted on these two cross plates 21 is a bridge 22, preferably of such shape, as shown in Fig. 3, as to have its central portion just clear the differential case 12, while its ends reach out and down to the cross plates 21.

The bridge 22 carries at its center and upper portion an upstanding pin 23; and the bifurcated forward end 24 of trailer tongue 25 is adapted to engage with pin 23 in the manner shown in the drawings. The front end of the trailer, when unconnected with the carriage vehicle, rests on a suitable support, as for instance, a small wheel or wheels 26; and in this position its tongue 25 will occupy about the relation to the pin 23 that is shown in Fig. 2. When it is desired to lift the forward end of the trailer and connect it with the towing vehicle, the parts are in the position shown in Fig. 2. The towing vehicle is backed into the trailer the pin 23 being backed into the bifurcations 24; and when the pin strikes the rear end of this bifurcation, then the pivoted structure (pivoted at 15) is swung up to the position shown in Fig. 1. At this time the tongue 25 is resting on bridge 22, and so this upward swinging movement raises the tongue and raises the forward end of the trailer, to the position shown in Fig. 1.

I also provide a means for automatically coupling the trailer to the towing vehicle; and although such means may be provided in a variety of manners, I here illustrate one typical arrangement. For instance, I may secure a cross bar 30 between the lower parts of the two yokes 20, the middle part of this cross bar extending rearwardly of the yokes, as illustrated in the drawings. When the pivoted parts turn up to the position shown in Fig. 1, this cross bar moves from the position shown in Fig. 2 up to the position shown in Fig. 1. At the same time that this motion takes place, the towing vehicle is moving back onto the trailer, and therefore the cross bar 30 is moving back as well as upwardly; and, as it moves back and upwardly, it comes up between two rollers or pins 32 mounted at the forward end of a draft bar 33 on the trailer. This draft bar 33 may be pivoted at 34 and normally held in a horizontal position by some suitable means, as by a spring 35. The spring may be of such shape that it will not allow the draft bar to drop beyond its horizontal position, but will allow the draft bar to be moved up somewhat to allow the forward pin or roller 32 to ride forwardly over the upper surface of cross bar 30 as that bar moves upwardly and rearwardly under the forward pin 32. Then, when cross bar 30 reaches the position shown in Fig. 1, the forward pin 32 drops over the forward edge of the cross bar, and the trailer is thus coupled to the towing vehicle.

A draft coupling of this general kind also has several other advantageous functions. For instance, it will be seen that the action of the draft bar 33 bearing down on cross bar 30, acts as a stop (and in this case, advantageously, as a resilient stop) to further forward swinging motion of bridge 22 and pin 23 about the pivot 15. In other words, it keeps this pivoted structure from moving on forward past the position shown in Fig. 1.

Furthermore, the draft connection of course keeps the tongue 25 up against the pin 23; and therefore the draft connection keeps the pivoted swinging structure (the bridge 22, etc.) from tipping back to the position of Fig. 2 and from lowering the trailer. The pivoted structure cannot tip back, because in order to tip back the trailer must be shoved back, and the trailer cannot be shoved back because of the draft connection at 30, 32; and this draft connection cannot be broken merely by tipping the pivoted parts back toward the position shown in Fig. 2, because any tendency of those pivoted parts to tip back will immediately force the forward pin 32 back against bar 30 and thus stop further tipping of the structure. The only way in which the trailer can be disconnected from the towing vehicle is by lifting the pivoted draft bar 33, when the towing vehicle can then move forward, leaving the trailer behind and lowering it so that it rests on its forward support 26.

Having described a preferred form of my invention, I claim:

1. In a coupling device adapted to couple a trailer to a towing vehicle having a rear axle, a swinging trailer tongue supporting structure horizontally pivoted on the towing vehicle below the horizontal plane of the rear axle and adapted to swing toward and from a position in vertical alinement with its pivot.

2. In a coupling device adapted to couple a trailer to a towing vehicle having a rear axle, a swinging trailer tongue supporting structure horizontally pivoted on the towing vehicle under the rear axle and adapted to swing toward and from a vertical position toward and from its pivot.

3. A coupling device adapted to couple a trailer to a towing vehicle, comprising a swinging structure horizontally pivoted to the towing vehicle and adapted to swing to and from a position in vertical alinement with its pivot, draft connection means between the towing vehicle and trailer, and means associated with the draft connection to limit movement of the swinging structure.

4. In a coupling device adapted to couple a trailer to a towing vehicle having a rear axle, a pair of pivot carrying members affixed to the vehicle structure, a swinging structure pivoted on said members at points below the horizontal plane of the rear axle, and embodying a bridge adapted to carry the forward end of the trailer, and means to limit the swinging movement of said structure.

5. In a coupling device adapted to couple a trailer to a towing vehicle having a rear axle, a pair of pivot carrying members affixed to the vehicle structure, a swinging structure pivoted on said members at a point under the rear axle and embodying a bridge adapted to carry the forward end of the trailer, and means to limit the swinging movement of said structure, said bridge being located above the pivots and above the rear axle and the structure swinging to and from a position in which the bridge is substantially vertically above the pivots.

6. A coupling device adapted to couple a trailer to a towing vehicle, embodying a pair of pivot carrying members affixed to the vehicle structure, a swinging structure pivoted on said members and embodying a bridge adapted to carry the forward end of the trailer, and means to limit the swinging movement of said structure, and draft connection means between the trailer and vehicle in association with the swinging structure.

7. A coupling device adapted to couple a trailer to a towing vehicle, embodying a pair of pivot carrying members affixed to the vehicle structure, a swinging structure pivoted on said members and embodying a bridge adapted to carry the forward end of the trailer, and means to limit the swinging movement of said structure, and draft connection means between the trailer and vehicle in association with the swinging structure, said draft connection means also forming a movement limiting device for the swinging structure.

8. A coupling device adapted to couple a trailer to a towing vehicle having a rear axle housing, embodying a pair of pivot carrying members affixed to the axle housing near its opposite ends, yokes pivoted to said members and extending above the housing, and a bridge mounted on and between the upper ends of the yokes.

9. A coupling device adapted to couple a trailer to a towing vehicle having a rear axle housing, embodying a pair of pivot carrying members affixed to the axle housing near its opposite ends, yokes pivoted to said members and extending above the housing, and a bridge mounted on and between the upper ends of the yokes, a guide pin carried on the bridge, the trailer having a tongue with a bifurcated end adapted to rest on the bridge and encompass the pin.

10. A coupling device adapted to couple a trailer to a towing vehicle having a rear axle housing, embodying a pair of pivot carrying members affixed to the axle housing near its opposite ends, yokes pivoted to said members and extending above the housing, and a bridge mounted on and between the upper ends of the yokes, a guide pin carried on the bridge, the trailer having a tongue with a bifurcated end adapted to rest on the bridge and encompass the pin, the trailer having a draft bar with downward projections, and a cross bar mounted on and between the two yokes and adapted to swing up to a position between the draft bar projections.

11. A coupling device adapted to couple a trailer to a towing vehicle, comprising a swinging structure adapted to swing on a horizontal axis on the towing vehicle and having a part adapted to support a trailer tongue, and draft means connecting the towing vehicle and trailer and limiting relative horizontal movement therebetween.

12. A coupling device adapted to couple a trailer to a towing vehicle, comprising a swinging structure adapted to swing on a horizontal axis on the towing vehicle and having a part adapted to support a trailer tongue, and draft means connecting the towing vehicle and trailer and limiting relative horizontal movement therebetween, said draft means including a member that is moved by swinging movement of said swinging structure into draft connection position.

13. A coupling device adapted to couple a trailer to a towing vehicle, comprising a trailer tongue raising and supporting member movable with relation to the towing vehicle, and a separate draft connection between the vehicle and trailer and embodying a member that is moved into draft connection position by movement of the tongue supporting member.

14. A coupling device adapted to couple a trailer to a towing vehicle, comprising a trailer tongue supporting member bearing upon the vehicle at a point below its axle, and draft means connecting the vehicle and trailer and connecting to the vehicle at a point not above its axle.

15. A coupling device adapted to couple a trailer to a towing vehicle, comprising a swinging trailer tongue supporting member pivotally bearing upon the vehicle at a point below its axle, and draft means connecting the vehicle and trailer and connecting to the vehicle at a point not above its axle.

16. A device for raising and supporting a trailer tongue on a towing vehicle having a rear axle, embodying a structure swinging on a horizontal axis located below the rear axle and having a part engageable by the trailer tongue whereby the tongue is supported.

17. A device for raising and supporting a trailer tongue on a towing vehicle having a rear axle, embodying a structure swinging on a horizontal axis located below the rear axle and having a part extending above the pivot and engageable by the trailer tongue whereby the tongue is supported.

In witness that I claim the foregoing I have hereunto subscribed my name this 27th day of March 1923.

GARNER L. KNOX.